United States Patent
Abramczyk et al.

(10) Patent No.: US 11,173,861 B2
(45) Date of Patent: Nov. 16, 2021

(54) ASSEMBLY INCLUDING FOAM PAD FIXED TO AIRBAG

(71) Applicant: Ford Global Technologies, LLC, Dearborn, MI (US)

(72) Inventors: Joseph E. Abramczyk, Farmington Hills, MI (US); Zhibing Deng, Northville, MI (US); Jeffrey C. Paddock, Dearborn Heights, MI (US); Deepak Patel, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/711,655

(22) Filed: Dec. 12, 2019

(65) Prior Publication Data

US 2021/0179001 A1 Jun. 17, 2021

(51) Int. Cl.
| | |
|---|---|
| *B60R 21/055* | (2006.01) |
| *B60R 21/207* | (2006.01) |
| *B60R 21/231* | (2011.01) |
| *B60R 21/235* | (2006.01) |
| *B60R 21/00* | (2006.01) |

(52) U.S. Cl.
CPC .......... *B60R 21/055* (2013.01); *B60R 21/207* (2013.01); *B60R 21/235* (2013.01); *B60R 21/23138* (2013.01); *B60R 2021/0006* (2013.01); *B60R 2021/0044* (2013.01); *B60R 2021/0055* (2013.01); *B60R 2021/23146* (2013.01); *B60R 2021/23576* (2013.01)

(58) Field of Classification Search
CPC .................................................. B60R 21/055
See application file for complete search history.

(56) References Cited

U.S. PATENT DOCUMENTS

| | | | |
|---|---|---|---|
| 6,457,739 B1 * | 10/2002 | Dailey | B60R 21/2165 280/728.3 |
| 6,734,125 B2 | 5/2004 | Veiga | |
| 7,384,063 B2 * | 6/2008 | Riester | B60R 21/21 280/728.2 |
| 7,686,331 B2 | 3/2010 | Li et al. | |
| 9,283,914 B2 * | 3/2016 | Fujiwara | B60N 2/427 |
| 96,370,814 | 5/2017 | Ryan et al. | |
| 2020/0070768 A1 * | 3/2020 | Mori | B60R 21/055 |

FOREIGN PATENT DOCUMENTS

| | | |
|---|---|---|
| DE | 19958152 B4 | 10/2007 |
| DE | 102008049504 A1 | 4/2010 |

* cited by examiner

*Primary Examiner* — Faye M Fleming
(74) *Attorney, Agent, or Firm* — Frank A. MacKenzie; Bejin Bieneman PLC

(57) ABSTRACT

An assembly includes an airbag that has a panel defining an inflation chamber. The assembly includes a foam pad exterior to the inflation chamber with the foam pad fixed to the panel of the airbag. The foam pad is intended to provide an additional layer of reinforcement for the inflation chamber 18 when the foam pad interacts with its surroundings upon inflation.

18 Claims, 8 Drawing Sheets

ASSEMBLY INCLUDING FOAM PAD FIXED TO AIRBAG

BACKGROUND

A side airbag is mounted to a seatback and is inflatable along a side of an occupant, specifically along the torso and/or hip of the occupant. The side airbag, for example, may be inflatable between the occupant and a vehicle door. The side airbag controls the kinematics of the occupant in vehicle impacts that urge the occupant in a cross-vehicle direction, e.g., a side impact.

DETAILED DESCRIPTION

Figure 1:
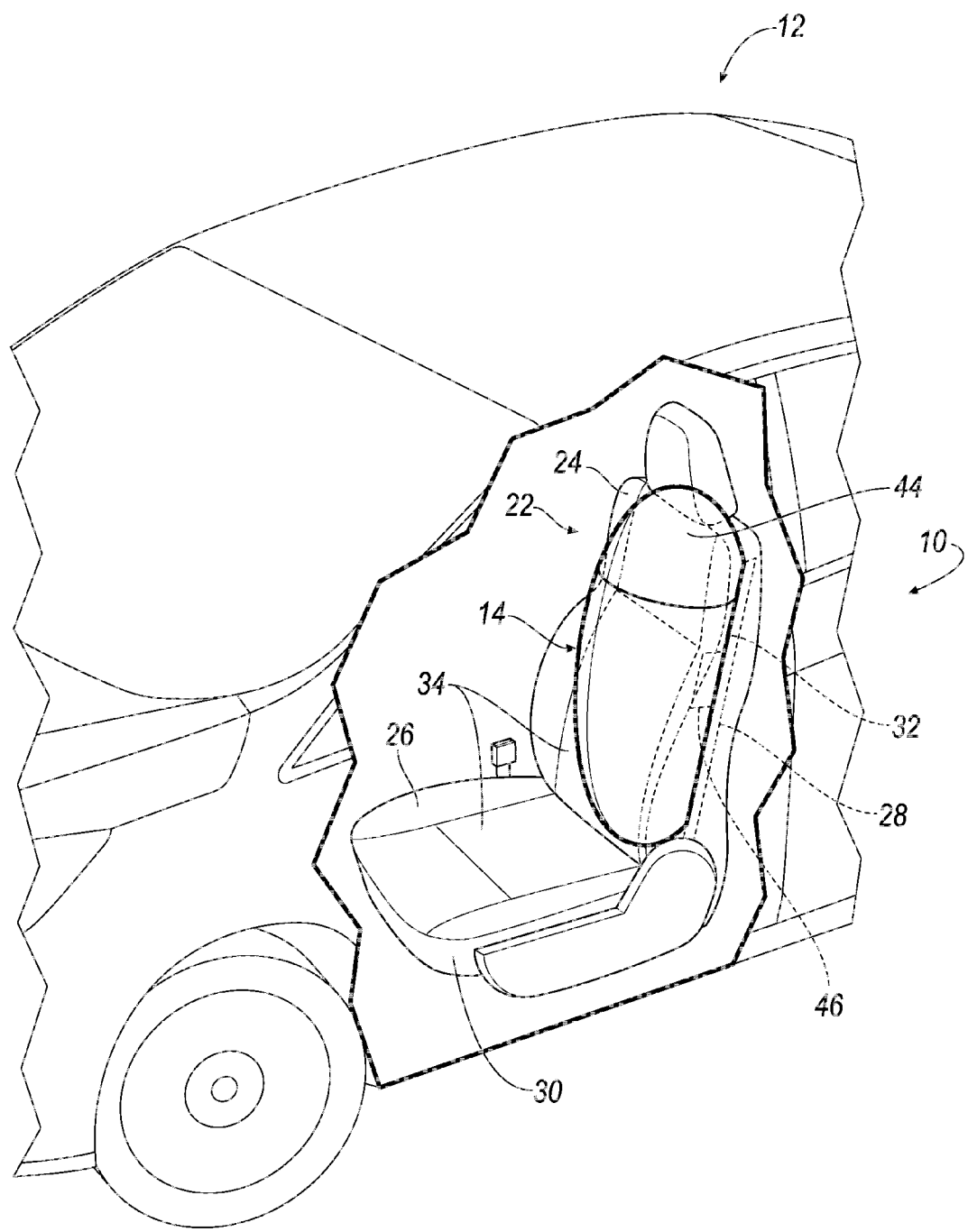
FIG. 1 is a perspective view of a vehicle including a seat and an airbag in an inflated position with an exterior panel fixed to the airbag and a foam panel between the exterior panel and the airbag.

An assembly includes an airbag having a panel defining an inflation chamber and a foam pad exterior to the inflation chamber and fixed to the panel.

The assembly may include an exterior panel fixed to the panel, the foam pad being between the panel of the airbag and the exterior panel.

The exterior panel may be directly fixed to the panel.

The foam pad may be fixed directly to the panel and/or the exterior panel.

The foam pad may be fixed to the panel and/or the exterior panel by at least one stitch.

The foam pad may be fixed to the panel and the exterior panel by a stitch extending through the panel, the foam pad, and the exterior panel.

The foam pad may be fixed to the panel and the exterior panel by adhesive.

The foam pad may be directly fixed to the panel of the airbag.

The assembly may include a housing, the airbag and the foam pad being in the housing when the airbag is in an uninflated position and spaced from the housing when the airbag in an inflated position.

The foam pad may move with the panel of the airbag from an uninflated position to an inflated position.

The panel may support the foam pad when the airbag is in the inflated position.

The panel and the exterior panel may be of the same material type.

An assembly includes a seatback, an airbag supported by the seatback, the airbag having a panel defining an inflation chamber, and a foam pad exterior to the inflation chamber and fixed to the panel.

The assembly may include a housing supported by the seatback, the airbag and the foam pad being in the housing when the airbag is in an uninflated position and spaced from the housing when the airbag in an inflated position.

The foam pad may move with the panel of the airbag from the uninflated position to the inflated position.

The panel may move the foam pad when the airbag is in the inflated position.

The assembly may include a door having a window, the airbag being inflated to an inflated position in which the foam pad is between the window and the panel.

The assembly may include an exterior panel fixed to the panel, the foam pad being between the panel of the airbag and the exterior panel.

The assembly may include a door having a window, the airbag being inflatable to an inflated position in which the exterior panel is between the window and the foam pad.

With reference to the Figures, wherein like numerals indicate like parts throughout the several views, an assembly 10 for a vehicle 12 includes an airbag 14 having a panel 16 defining an inflation chamber 18. The assembly 10 includes a foam pad 20 exterior to the inflation chamber 18 with the foam pad 20 being fixed to the panel 16 of the airbag 14.

Since the foam pad 20 is exterior to the inflation chamber 18, the foam pad 20 is intended to provide an additional layer of reinforcement for the inflation chamber 18 when the foam pad 20 interacts with its surroundings upon inflation. Since the foam pad 20 is fixed to the panel 16 of the airbag 14, the foam pad 20 is compressed and/or folded when the airbag 14 is in an uninflated position and expands (i.e., opens, unfolds, etc.) as the inflation chamber 18 is inflated and the airbag 14 moves to an inflated position.

Figure 5:
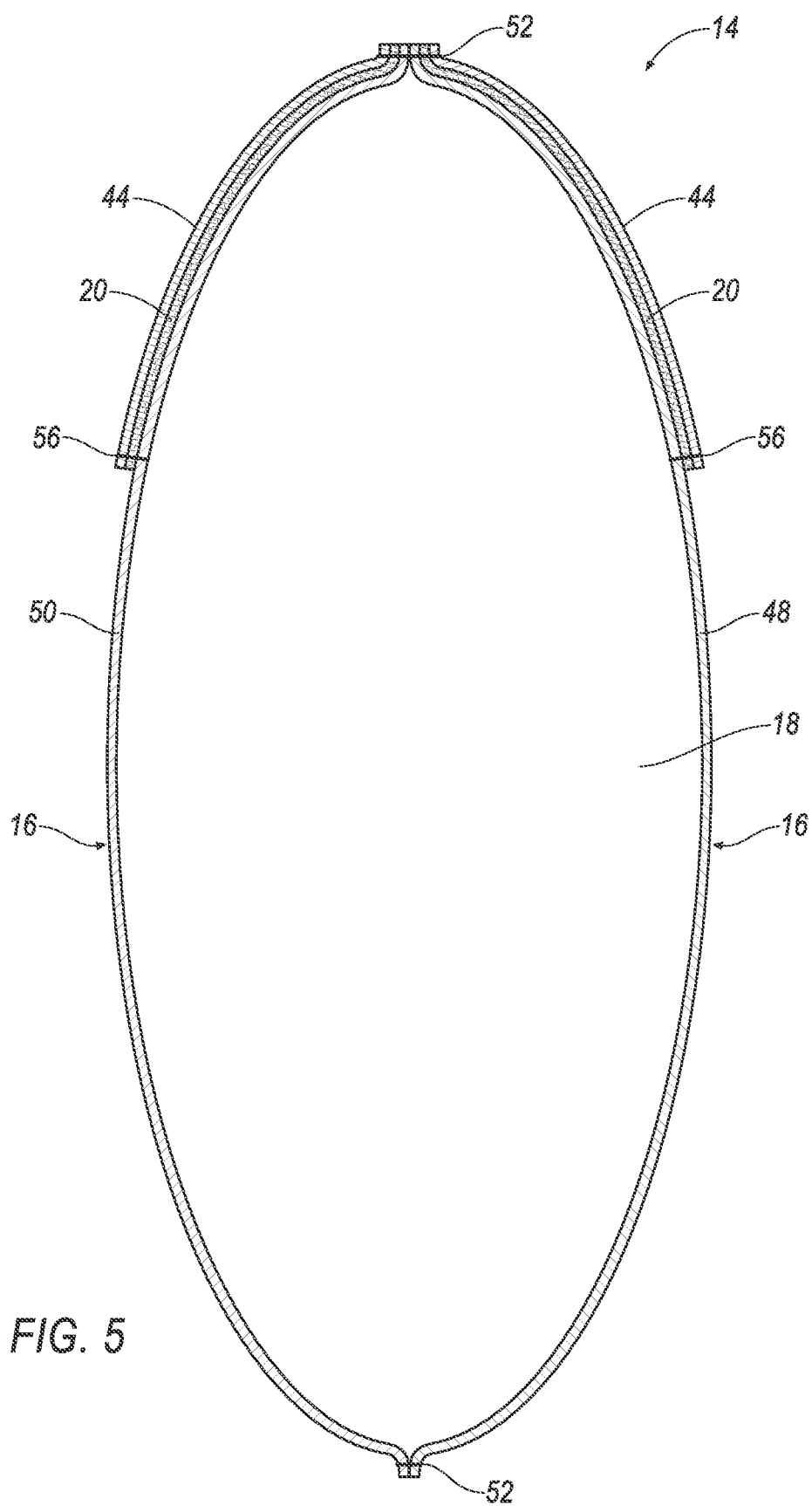
FIG. 5 is a cross-sectional view through line 4 of FIG. 4 showing an embodiment of the airbag in which the foam pad and the exterior panel are stitched to the airbag.
Figure 6:
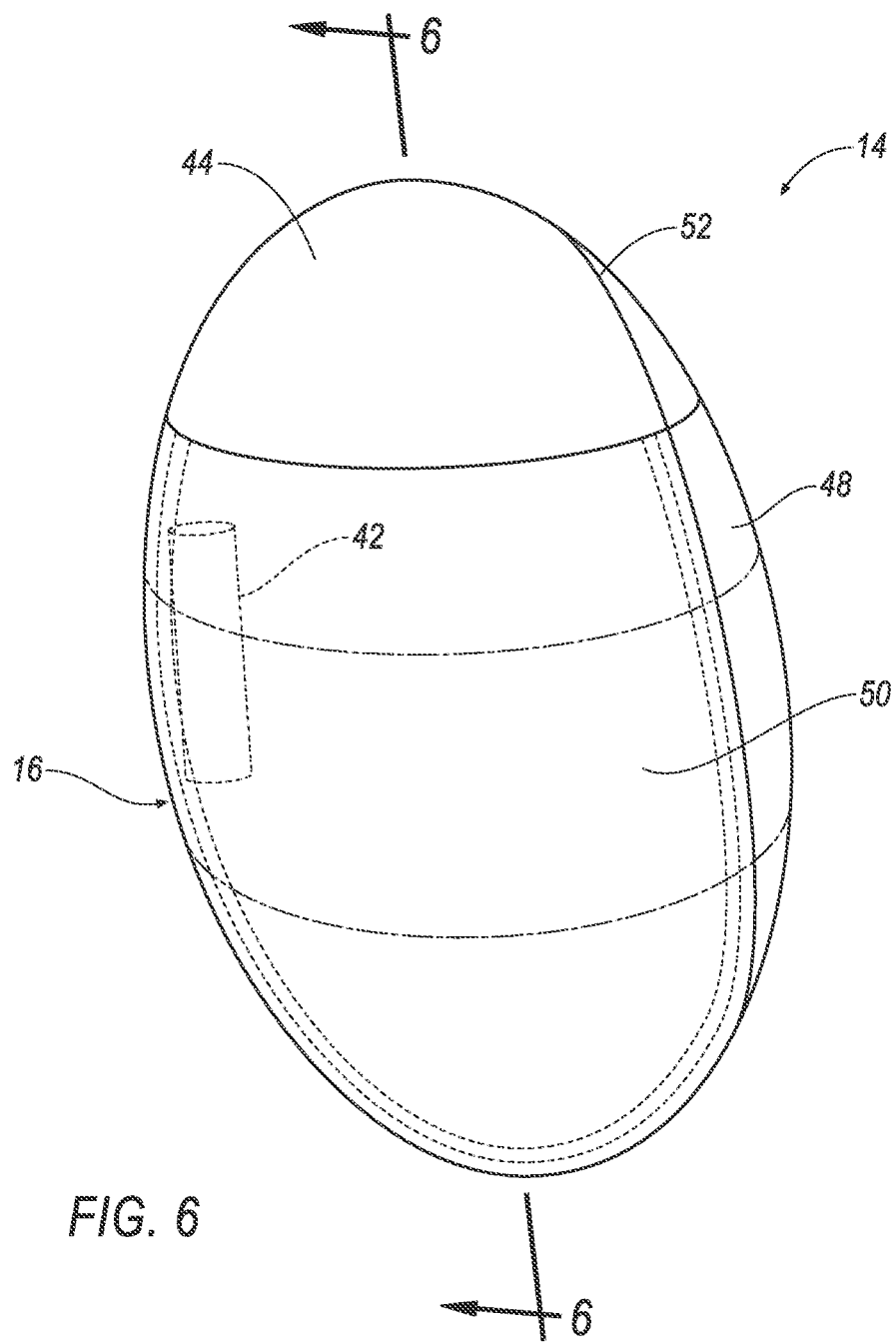
FIG. 6 is a perspective view of the airbag in the inflated position with the foam pad fixed to the airbag wherein the exterior panel is attached to the panel of the airbag by adhesive.
Figure 7:
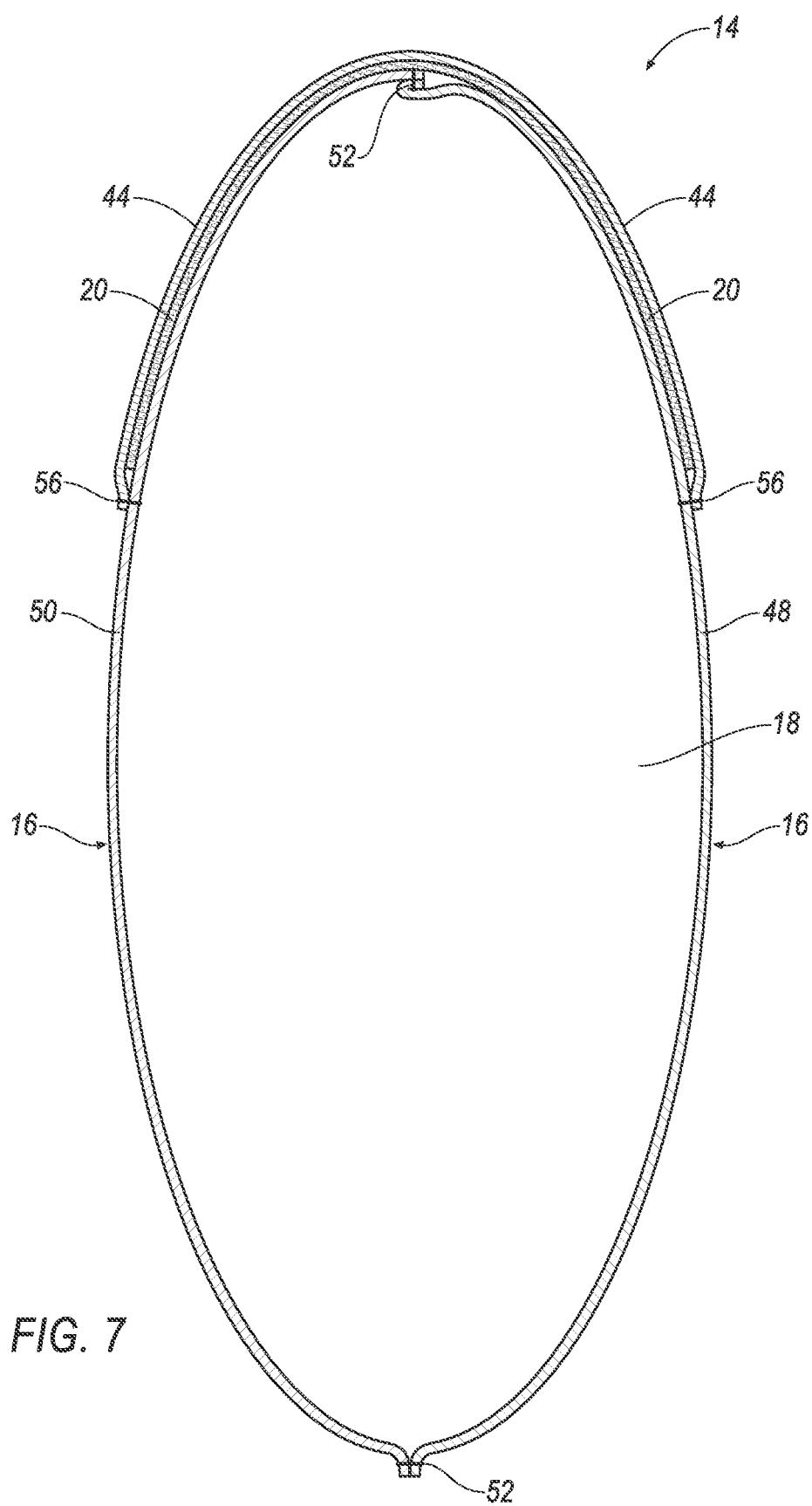
FIG. 7 is a cross-sectional view through line 6 of FIG. 6 showing another embodiment of the airbag in which the of the airbag shown in FIG. 6 wherein the stitching extends through the exterior panel and the panel of the airbag.
Figure 8:
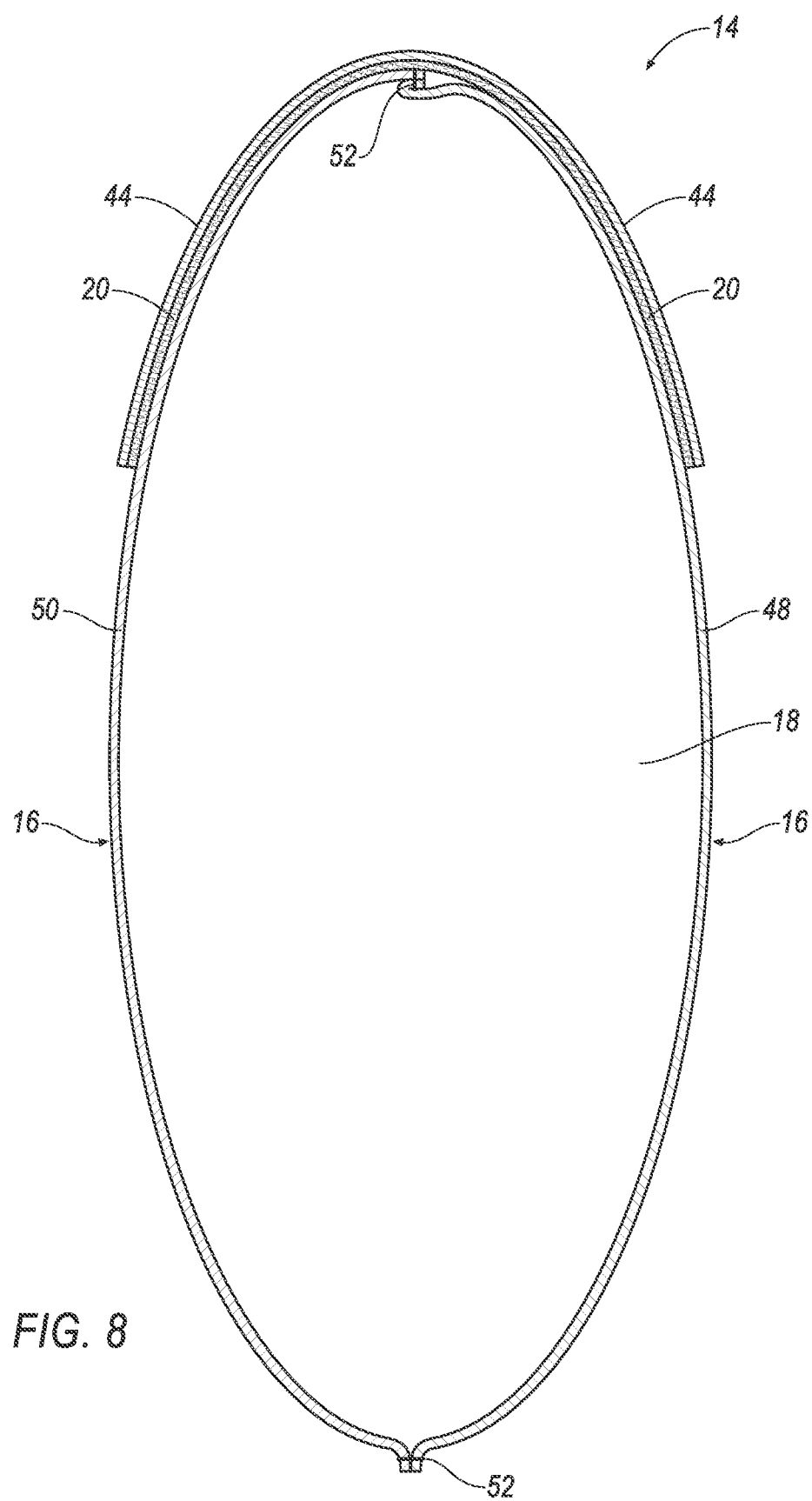
FIG. 8 is a cross-sectional view of the airbag shown in FIG. 6.

One embodiment of the assembly 10 is shown in FIG. 5 in which the foam pad 20 includes two segments and panel 16 includes two segments with both segments of the foam pad 20 and both segments of the panel 16 fixed to the panel 16 of the airbag 14, e.g., by stitching. Another embodiment of the assembly 10 is shown in FIG. 7 in which an exterior panel 44 is directly fixed to the panel 16 of the airbag 14, e.g., by stitching. Another embodiment of the assembly 10 is shown in FIG. 8 in which the foam pad 20 is directly fixed to the panel 16 of the airbag 14, e.g., by adhesive, and the exterior panel 44 is directly fixed to the foam pad 20, e.g., by adhesive. Common numerals are used to identify common features in the example embodiments.

The vehicle 12 may be any type of passenger or commercial automobile such as a car, a truck, a sport utility vehicle, a crossover vehicle, a van, a minivan, a taxi, a bus, etc. The vehicle 12 includes at least one seat 22. The seat 22 may be of any suitable type, e.g., a bucket seat, a bench seat, etc. The seat 22 may be at any suitable location, e.g., a front seat, rear seat, driver seat, passenger seat, etc.

The vehicle 12 includes a passenger cabin (not shown) to house occupants, if any, of the vehicle 12. The seat 22 may be housed within the passenger cabin.

Figure 2:
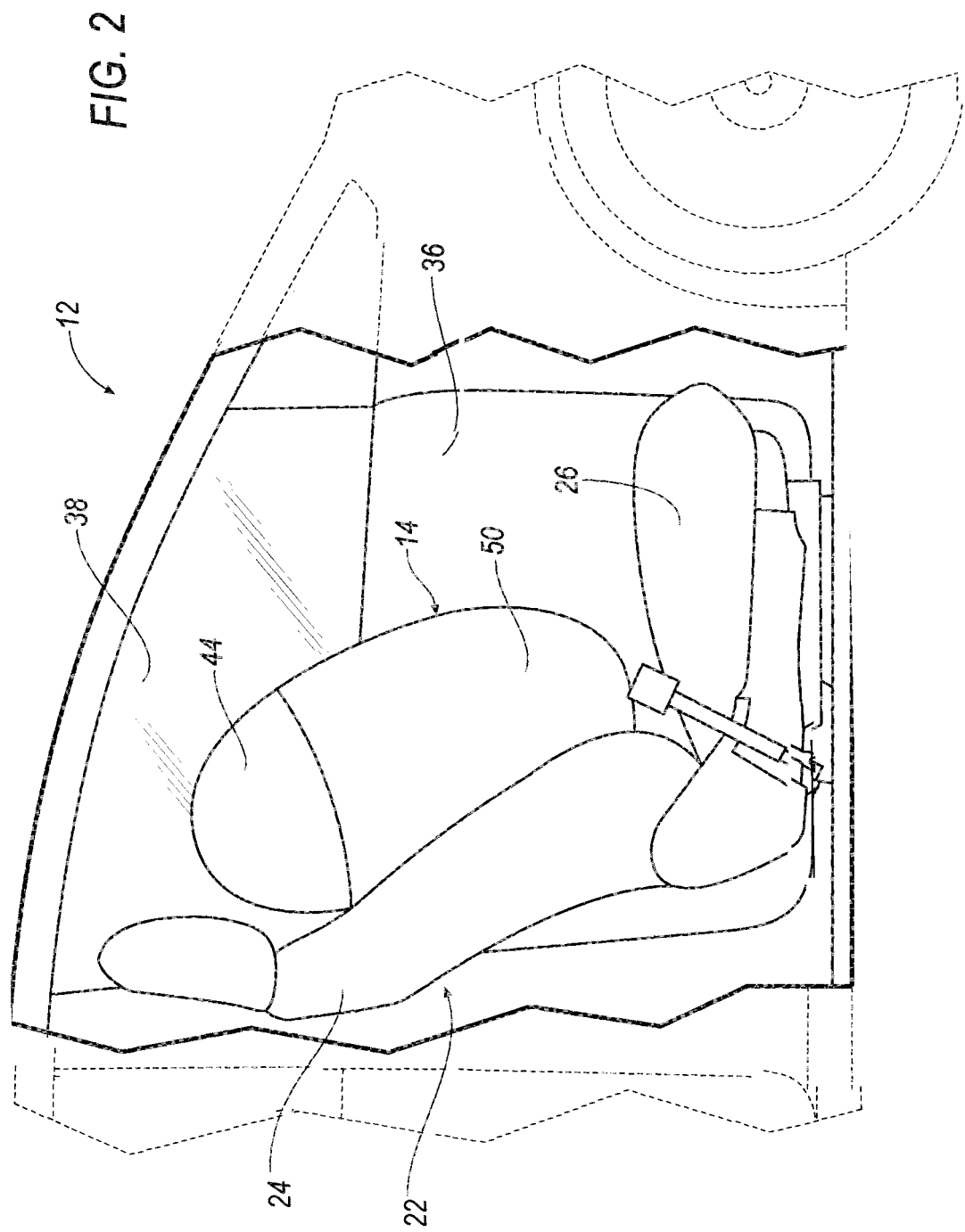
FIG. 2 is a side view of the vehicle with the airbag in the inflated position.

As shown in FIGS. 1 and 2, the seat 22 includes the seatback 24 and a seat bottom 26. The seatback 24 may be supported by the seat bottom 26 and may be stationary or movable relative to the seat bottom 26. The seatback 24 and the seat bottom 26 may be adjustable in multiple degrees of freedom. Specifically, the seatback 24 and the seat bottom 26 may themselves be adjustable, in other words, adjustable components within the seatback 24 and/or the seat bottom 26, and/or may be adjustable relative to each other.

The seatback 24 may include a seatback frame 28 and a covering 30 supported by the seatback frame 28. The seatback frame 28 may include tubes, beams, etc. Specifically, the seatback frame 28 includes a pair of upright frame members 32 (one of which is identified in FIG. 1). The upright frame members 32 are elongated, and specifically, are elongated in a generally upright direction when the seatback 24 is in a generally uprights position. The upright frame members 32 are spaced from each other and the seatback frame 28 includes cross-members (not shown) extending between the upright frame members 32. The seatback 24 may be of any suitable plastic material, e.g., carbon fiber reinforced plastic (CFRP), glass fiber-reinforced semi-finished thermoplastic composite (organosheet), etc. As another example, some or all components of the seatback frame 28 may be formed of a suitable material, e.g., steel, aluminum, etc.

With continued reference to FIGS. 1 and 2, the covering 30 may include upholstery and padding. The upholstery may be cloth, leather, faux leather, or any other suitable material. The upholstery may be stitched in panel 16 around the frame. The padding may be between the covering 30 and the seatback frame 28 and the foam or any other suitable material.

The seatback 24 defines an occupant seating area 34. The occupant may be disposed in the occupant seating area 34. The occupant seating area 34 is on a front side of the seatback 24. The airbag 14 extends from the seatback 24 next to the occupant seating area 34 to control occupant kinematics.

The airbag 14 is deployable between the occupant and a door 36 of the vehicle 12. In the example shown in FIGS. 1 and 2, the seat 22 is a front seat and the door 36 is a front door. Alternatively, the seat 22 and door 36 may be any other suitable location, e.g., a rear seat and rear door.

The door 36 may be adjacent the seatback 24. The door 36 may have a window 38 adjacent the seatback 24. The windows 38 may be formed of a transparent material, including glass, such as laminated glass, tempered glass, etc., or plastic such as polycarbonate, etc., or any other suitable material.

Figure 3:
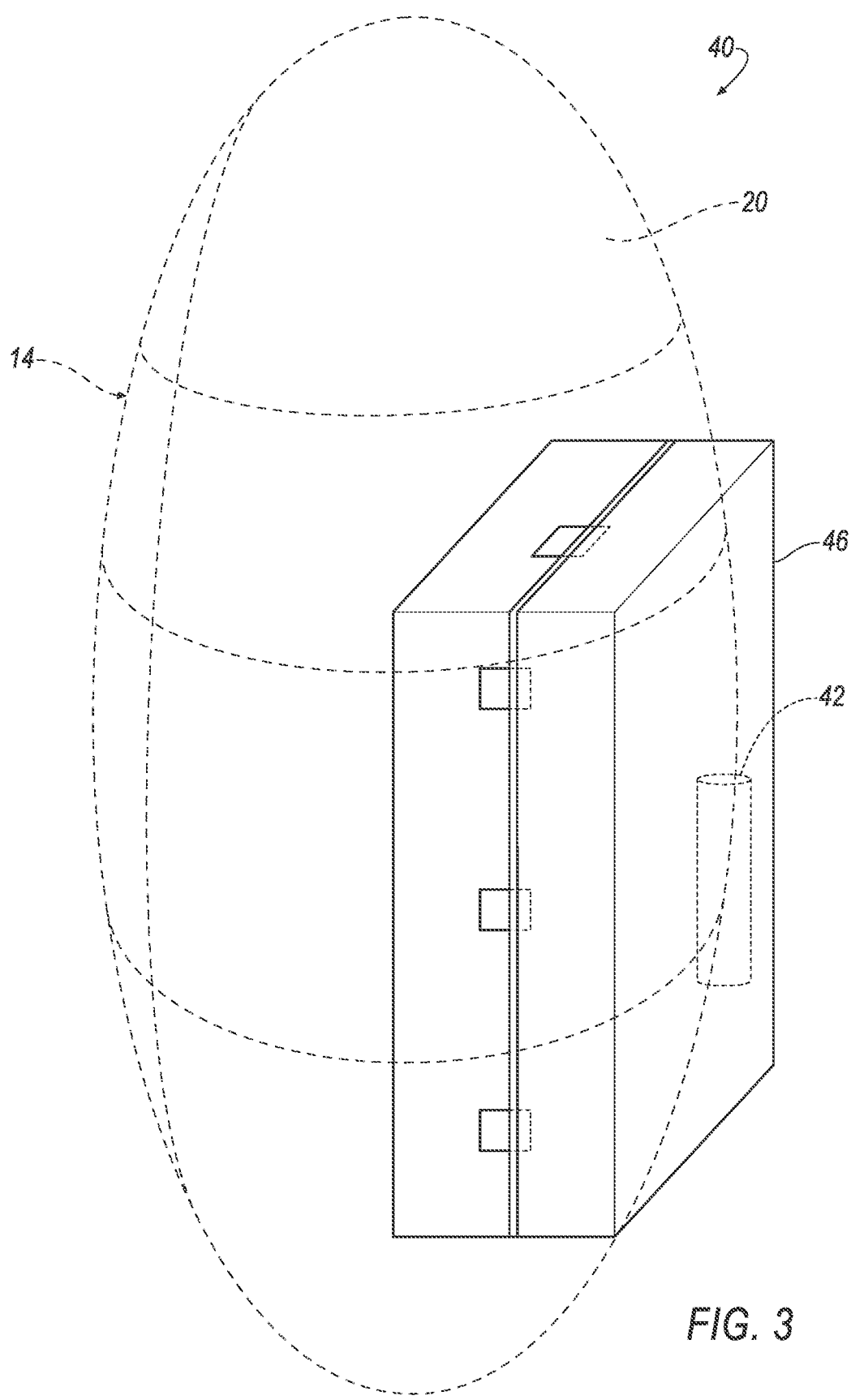
FIG. 3 is a perspective view of an airbag assembly including a housing with the airbag and the foam panel shown in broken lines in the inflated position.
Figure 4:
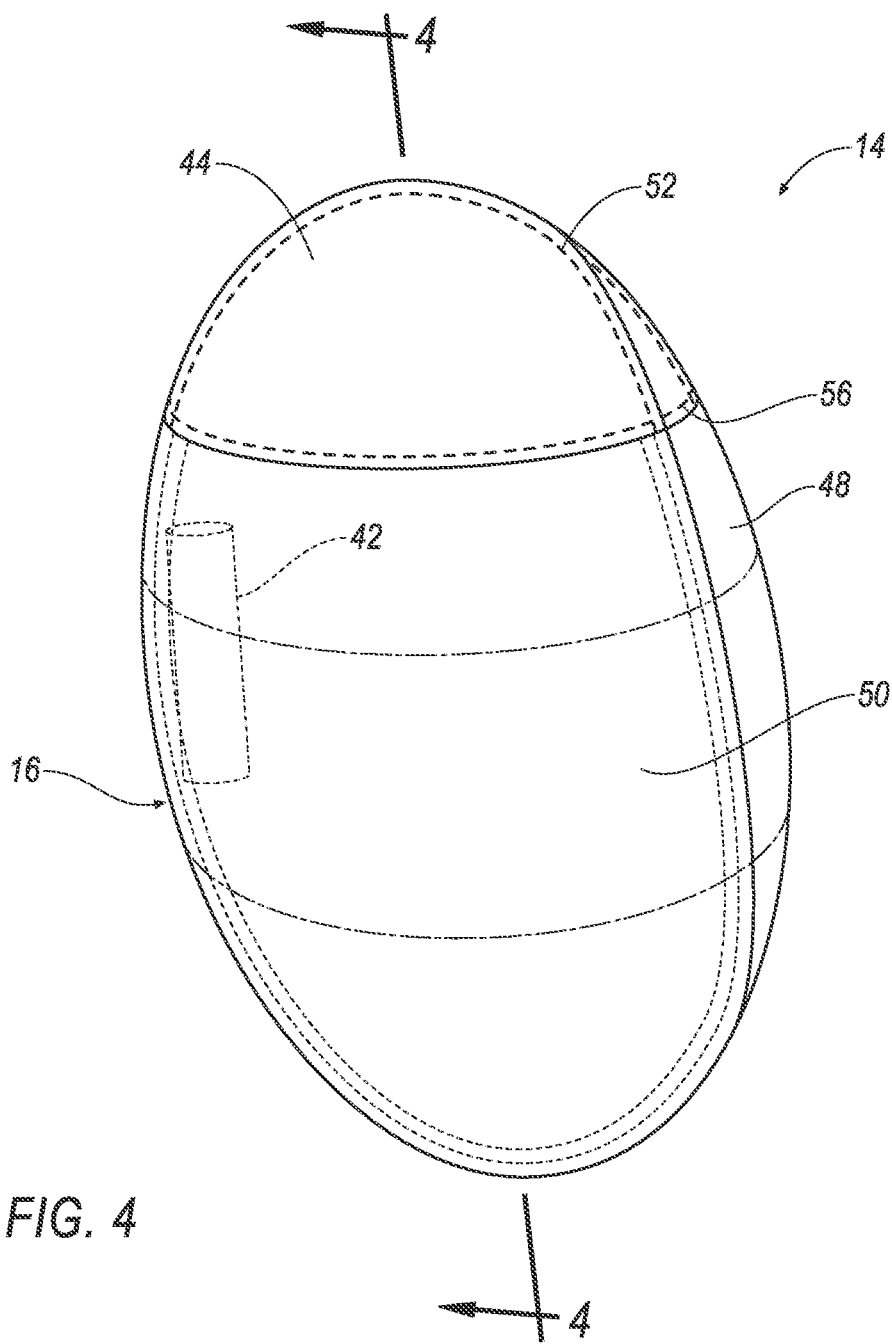
FIG. 4 is a perspective view of an embodiment of the airbag in which the exterior panel and the foam pad are stitched to the airbag.

As shown in FIG. 3, the assembly 10 may include an airbag assembly 40 that includes the airbag 14, the foam pad 20, and an inflator 42. The airbag assembly 40 may include an exterior panel 44, as described further below. The airbag assembly 40 may include a housing 46. In such examples, the airbag 14, the foam pad 20, and the exterior panel 44 may be in the housing 46 when the airbag 14 is in the uninflated position. The housing 46 provides a reaction surface for the airbag 14 in the inflated position. The housing 46 may be of any suitable material, e.g., a rigid polymer, a metal, a composite, etc. The inflator 42 may be supported by the housing 46 and, for example, may be in the housing 46.

As shown in FIG. 1, the housing 46 may be supported by the seatback 24, e.g., the housing 46 may be mounted to the upright frame member 32 of the seatback frame 28. For example, the housing 46 may include locating elements, fasteners, etc., that engage the seatback 24 and/or fasteners may engage the housing 46 and the seatback 24 to mount the housing 46 to the seatback 24.

The inflator 42 is connected to the airbag 14, i.e., the inflator 42 is in fluid communication with the inflation chamber 18 of the airbag 14. Upon receiving a signal from, e.g., a computer, the inflator 42 may inflate the airbag 14 with an inflation medium, such as a gas. Specifically, the airbag 14 has an inflation chamber 18 that receives the inflation medium, i.e., is inflated by the inflation medium. The inflator 42 may be, for example, a pyrotechnic inflator that uses a chemical reaction to drive inflation medium to the airbag 14. The inflator 42 may be of any suitable type, for example, a cold-gas inflator.

As shown in FIGS. 1 and 2, the airbag 14 may be supported by the seatback 24, e.g., the housing 46 may be supported by the upright frame member 32 of the seatback 24. The airbag 14, in the uninflated position, is disposed in the seatback 24 and concealed behind the covering 30. The covering 30 may be frangible relative to a force of inflation of the airbag 14 at the location where the airbag 14 is mounted to the upright frame member 32. The airbag 14 is inflatable in a forward direction relative to the seatback 24. The airbag 14, in the inflated position, extends forward of the seatback 24 and extends between an occupant sitting against the seatback 24 and the window 38 nearest the seatback 24, i.e., the window 38 vehicle outboard of the seatback 24. The airbag 14 in the inflated position extends below a top of the door 36 to which the window 38 is mounted.

As shown in FIGS. 4-8, the panel 16 defines the inflation chamber 18. Specifically, the panel 16 includes an outboard portion 48 and an inboard portion 50 with the inflation chamber 18 defined therebetween. When the airbag 14 is in the inflated position, the inboard portion 50 is between the inflation chamber 18 the occupant seating area 34 and the outboard portion 48 is between the inflation chamber 18 and the door 36.

The panel 16 of the airbag 14 may include multiple panels 16 connected to each other. For example, the panel 16 may include an outboard panel and an inboard panel. In such an example, the outboard panel is the outboard portion 48 and the inboard panel is the onboard portion. The outboard panel and the inboard panel may be stitched together with an airbag seam 52. For example, when the airbag 14 is in the inflated position, the airbag seam 52 extends along a top, along a vehicle-forward edge, and along a bottom of the airbag 14. As another example, the panel 16 of the airbag 14 may be one-piece, i.e., a single, uniform piece of material with no seams, joints, fasteners, or adhesives holding it together and not multiple panels stitched together. In such an example, the panel 16 may be one-piece woven panel.

The panel 16 of the airbag 14 may be fabric. The panel 16 of the airbag 14 may be woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

As shown in FIG. 2, when the airbag 14 is in the inflated position, the foam pad 20 may be between the panel 16 and the window 38 of the door 36. As set forth above, the foam pad 20 is intended to provide an additional layer of reinforcement for the inflation chamber 18 when the foam pad 20 interacts with its surroundings upon inflation.

The foam pad 20 may abut the panel 16 of the airbag 14, i.e., directly contact. The foam pad 20 is exterior to the inflation chamber 18. In other words, the foam pad 20 is exterior to the panel 16. This positions the foam pad 20 to provide an additional layer of reinforcement for the inflation chamber 18 when the foam pad 20 interacts with its surroundings upon inflation. For example, the entire foam pad 20 is exterior to the inflation chamber 18.

The foam pad 20 may be fixed to an upper portion of the panel 16 when the airbag 14 is in the inflated position. For example, the foam pad 20 may be fixed to an upper portion of the outboard portion 48 of the panel 16. This positions the foam pad 20 between the window 38 of the door 36 and the panel 16 when the airbag 14 is in the inflated position. As shown in the Figures, the foam pad 20 may also be fixed to an upper portion of the inboard portion 50. The upper portion of the outboard panel is above the vertical midline of the panel 16.

A lower edge 54 of the foam pad 20 may be on the upper portion of the panel 16, i.e., above the vertical midline of the panel 16. In the example shown in the Figures, the foam pad 20 is fixed to the outboard portion 48 and the inboard portion 50 and is dome-shaped.

The foam pad 20 is in the housing 46 with the airbag 14 when the airbag 14 is in the uninflated position, as shown in FIG. 3. The foam pad 20 may be folded and/or compressed when the airbag 14 is in the uninflated position and inside the housing 46. The foam pad 20 moves with the airbag 14 as the airbag 14 inflates out of the housing 46. In the inflated position, the foam pad 20 may be spaced from the housing 46. The panel 16 of the airbag 14 supports the foam pad 20 when the airbag 14 is in the inflated position. The foam pad 20 assumes the same shape of the panel 16 when the airbag 14 is in the inflated position.

The foam pad 20 may be one-piece, i.e., a single, uniform piece of material with no seams, joints, fasteners, or adhesives holding it together. When one-piece, the foam pad 20 may be formed by molding, extrusion, etc. In examples in which the foam pad 20 is one-piece, the foam pad 20 may be fixed to both the inboard portion 50 and the outboard portion 48 of the panel 16 of the airbag 14, as shown in FIG. 8. As other examples, the foam pad 20 may include more than one segment. In such examples, the segments may be fixed directly or indirectly. As an example, one segment may be fixed to the inboard portion 50 and one segment may be fixed to the outboard portion 48, as shown in FIGS. 5 and 7.

The foam pad 20 is fixed to the panel 16 of the airbag 14, i.e., directly or indirectly fixed to the panel 16 of the airbag 14. Specifically, the foam pad 20 is fixed to the panel 16 of the airbag 14. In other words, the foam pad 20 and the panel 16 of the airbag 14 move together as a unit.

As set forth above, the foam pad 20 may be directly fixed to the panel 16 of the airbag 14, i.e., with a connection that engages both the foam pad 20 and the panel 16 of the airbag 14. For example, the foam pad 20 may be stitched to the panel 16 of the airbag 14, i.e., with stitching 56 that engages the foam pad 20 and the panel 16 of the airbag 14, as shown in FIG. 5. In such an example, the stitching 56 may also engage the exterior panel 44, as shown in FIG. 5, or the stitching 56 may engage only the foam pad 20 and the panel 16, i.e., not engaging the exterior panel 44. As another example, the foam pad 20 may be adhered to the panel 16 of the airbag 14, i.e., a surface of the foam pad 20 is adhered to a surface of the panel 16, as shown in FIG. 8. In the embodiment shown in FIG. 7, the foam pad 20 may be adhered to the panel 16 of the airbag 14.

As set forth above, the foam pad 20 may be indirectly fixed to the panel 16. For example, the exterior panel 44 may be fixed to the panel 16 and may retain the foam pad 20 fixed to the panel 16. In such example, foam pad 20 may be wedged between the exterior panel 44 and the panel 16 to indirectly fix the foam pad 20 to the panel 16 of the airbag 14. As another example, the foam pad 20 may be directly fixed to the exterior panel 44, e.g., by adhesive, stitching, etc.

The foam pad 20 is a foam material. Examples of the foam material include crushed ethylene propylene diene monomer (EPDM), Poly Vinyl Chloride (PVC), Polyether, Urethane foam, etc. The foam may be any suitable foam such that the foam may fully expand when the airbag 14 reaches the inflated position.

As set forth above, the airbag assembly 40 may include the exterior panel 44. In such examples, the foam pad 20 is between the panel 16 of the airbag 14 and the exterior panel 44. The exterior panel 44 may enclose, i.e., completely cover, the foam pad 20 between the exterior panel 44 and the panel 16 of the airbag 14. The exterior panel 44 may abut the foam pad 20, i.e., be in direct contact. In addition to the foam pad 20, the exterior panel 44 may be intended to provide an additional layer of reinforcement for the inflation chamber 18 when the exterior panel 44 interacts with its surroundings upon inflation When the airbag 14 is in the inflated position, the exterior panel 44 is between the window 38 and the panel 16 of the airbag 14. Specifically, the exterior panel 44 may be between the window 38 and the foam pad 20. In the inflated position, the exterior panel 44 may be adjacent the window 38 when the airbag 14 is in the inflated position. Specifically, the exterior panel 44 may abut the window 38 in the inflated position.

The exterior panel 44 is fixed to the panel 16 of the airbag 14, i.e., directly or indirectly fixed to the panel 16 of the airbag 14. In other words, the exterior panel 44, the foam pad 20, and the panel 16 of the airbag 14 move together as a unit.

As set forth above, the exterior panel 44 may be directly fixed to the panel 16 of the airbag 14, i.e., with a connection that engages both the exterior panel 44 and the panel 16 of the airbag 14. For example, the exterior panel 44 may be stitched to the panel 16 of the airbag 14, i.e., with stitching 56 that engages the exterior panel 44 and the panel 16 of the airbag 14, as shown in FIGS. 5 and 7. In such an example, the stitching 56 may also engage the foam pad 20, as shown in FIG. 5, or the stitching 56 may engage only the exterior panel 44 and the panel 16, i.e., not engaging the foam pad 20, as shown in FIG. 7. As another example, the exterior may be adhered to the panel 16 of the airbag 14, i.e., a surface of the exterior panel 44 is adhered to a surface of the panel 16. As an example, the exterior panel 44 may be adhered to the panel 16 in addition to or in the alternative to the stitch shown in FIG. 7.

As set forth above, the exterior panel 44 may be indirectly fixed to the panel 16. For example, the foam pad 20 may be directly fixed to the panel 16 and the exterior panel 44 may be directly fixed to the foam pad 20. For example, the foam pad 20 may be adhered to the exterior panel 44 may be adhered to the foam pad 20, as shown in FIG. 8.

The exterior panel 44 of the airbag 14 may be fabric. The exterior panel 44 may be of the same type of material as the panel 16 of the airbag 14, as described above. As another example, the type of material of the exterior panel 44 may be different than the panel 16 of the airbag 14.

The vehicle 12 may include a plurality of impact sensors. The impact sensors may be in communication with the computer. The impact sensors are programmed to detect an impact to the vehicle 12. The impact sensors may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensors may be located at numerous points in or on the vehicle 12.

The communication network includes hardware, such as a communication bus, for facilitating communication among vehicle components. The communication network may facilitate wired or wireless communication among the vehicle components in accordance with a number of communication protocols such as controller area network (CAN), Ethernet, WiFi, Local Interconnect Network (LIN), and/or other wired or wireless mechanisms.

The computer, implemented via circuits, chips, or other electronic components, is included in the vehicle control system for carrying out various operations, including as described herein. The computer is a computing device that generally includes a processor and a memory, the memory including one or more forms of computer-readable media and storing instructions executable by the processor for performing various operations, including as disclosed herein. The memory of the computer further generally stores remote data received via various communications mechanisms; e.g., the computer is generally configured for communications on a controller area network (CAN) bus or the like, and/or for using other wired or wireless protocols, e.g., Bluetooth, etc. The computer may also have a connection to an onboard diagnostics connector (OBD-II). Via a communication network using Ethernet, WiFi, the CAN bus, Local Interconnect Network (LIN), and/or other wired or wireless mechanisms, the computer may transmit messages to various devices in the vehicle 12 and/or receive messages from the various devices, e.g., controllers, actuators, sensors, etc., as discussed herein. For example, the computer may receive data from vehicle sensors. Although one computer is shown in FIG. 1 for ease of illustration, it is to be understood that the computer could include, and various operations described herein could be carried out by, one or more computing devices.

In the event of an impact, the impact sensors may detect the impact and transmit a signal through the communications network to the computer. The computer may transmit a signal through the communications network to the inflator 42. The inflator 42 may discharge and inflate the airbag 14 to the inflated position.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
   an airbag having a panel defining an inflation chamber;
   a foam pad exterior to the inflation chamber and fixed to the panel; and
   an exterior panel fixed to the panel, the foam pad being between the panel of the airbag and the exterior panel; and
   the foam pad being fixed to the panel and/or the exterior panel by at least one stitch.

2. The assembly of claim 1, wherein the exterior panel is directly fixed to the panel.

3. The assembly of claim 2, wherein the foam pad is fixed directly to the panel and/or the exterior panel.

4. The assembly of claim 1, wherein the foam pad is fixed directly to the panel and/or the exterior panel.

5. The assembly of claim 1, wherein the foam pad is fixed to the panel and the exterior panel by a stitch extending through the panel, the foam pad, and the exterior panel.

6. The assembly of claim 1, wherein the foam pad is fixed to the panel and the exterior panel by adhesive.

7. The assembly of claim 1, wherein the foam pad is directly fixed to the panel of the airbag.

8. The assembly of claim 1, further comprising a housing, the airbag and the foam pad being in the housing when the airbag is in an uninflated position and spaced from the housing when the airbag is in an inflated position.

9. The assembly of claim 1, wherein the foam pad moves with the panel of the airbag from an uninflated position to an inflated position.

10. The assembly of claim 9, wherein the panel supports the foam pad when the airbag is in the inflated position.

11. The assembly of claim 1, wherein the panel and the exterior panel are of the same material type.

12. An assembly comprising:
    a seatback;
    an airbag supported by the seatback, the airbag having a panel defining an inflation chamber;
    a foam pad exterior to the inflation chamber and fixed to the panel; and
    a housing supported by the seatback, the airbag and the foam pad being in the housing when the airbag is in an uninflated position and spaced from the housing when the airbag is in an inflated position.

13. The assembly of claim 12, wherein the foam pad moves with the panel of the airbag from the uninflated position to the inflated position.

14. The assembly of claim 12, wherein the panel supports the foam pad when the airbag is in the inflated position.

15. The assembly of claim 12, further comprising a door having a window, the airbag being inflated to an inflated position in which the foam pad is between the window and the panel.

16. The assembly of claim 12, further comprising an exterior panel fixed to the panel, the foam pad being between the panel of the airbag and the exterior panel.

17. The assembly of claim 16, further comprising a door having a window, the airbag being inflatable to an inflated position in which the exterior panel is between the window and the foam pad.

18. An assembly comprising:
    an airbag having a panel defining an inflation chamber;
    a foam pad exterior to the inflation chamber and fixed to the panel;
    an exterior panel fixed to the panel, the foam pad being between the panel of the airbag and the exterior panel; and
    the foam pad being fixed to the panel and the exterior panel by a stitch extending through the panel, the foam pad, and the exterior panel.

* * * * *